Oct. 21, 1952         E. J. CRANE         2,614,287
POULTRY SHACKLE
Filed June 25, 1949                    2 SHEETS—SHEET 2
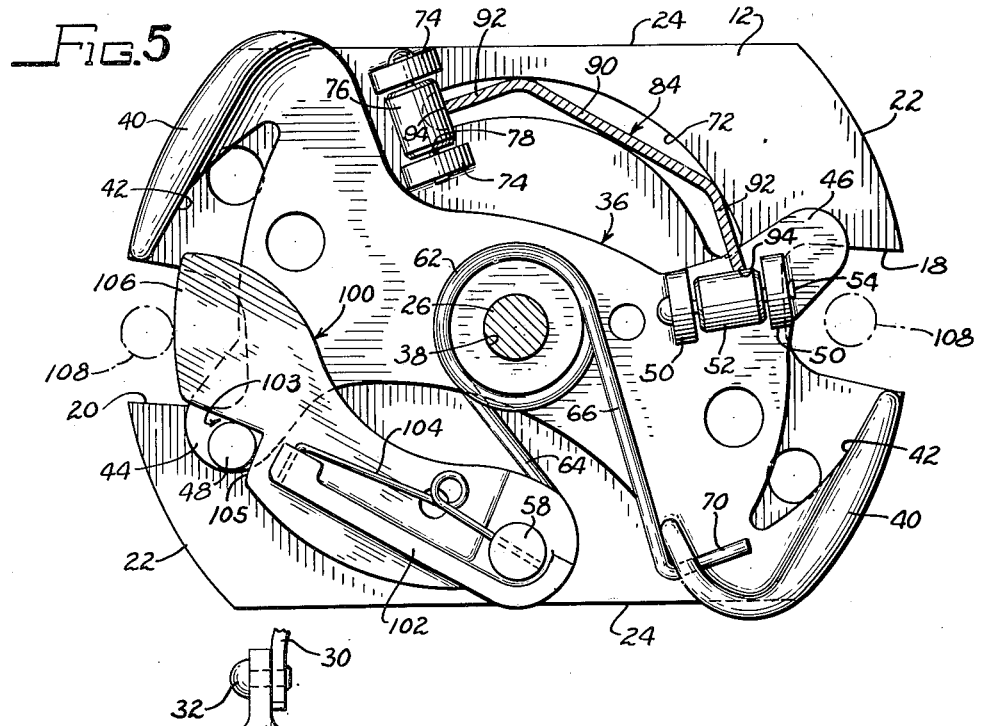
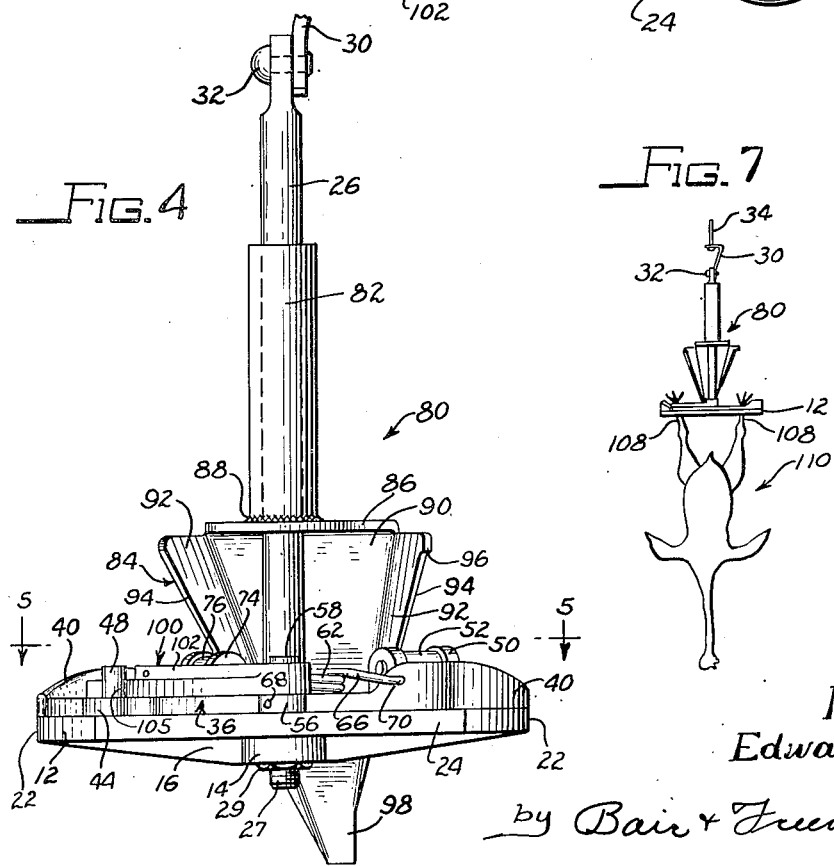
Inventor
Edward J. Crane
by Bair & Freeman
Attys.

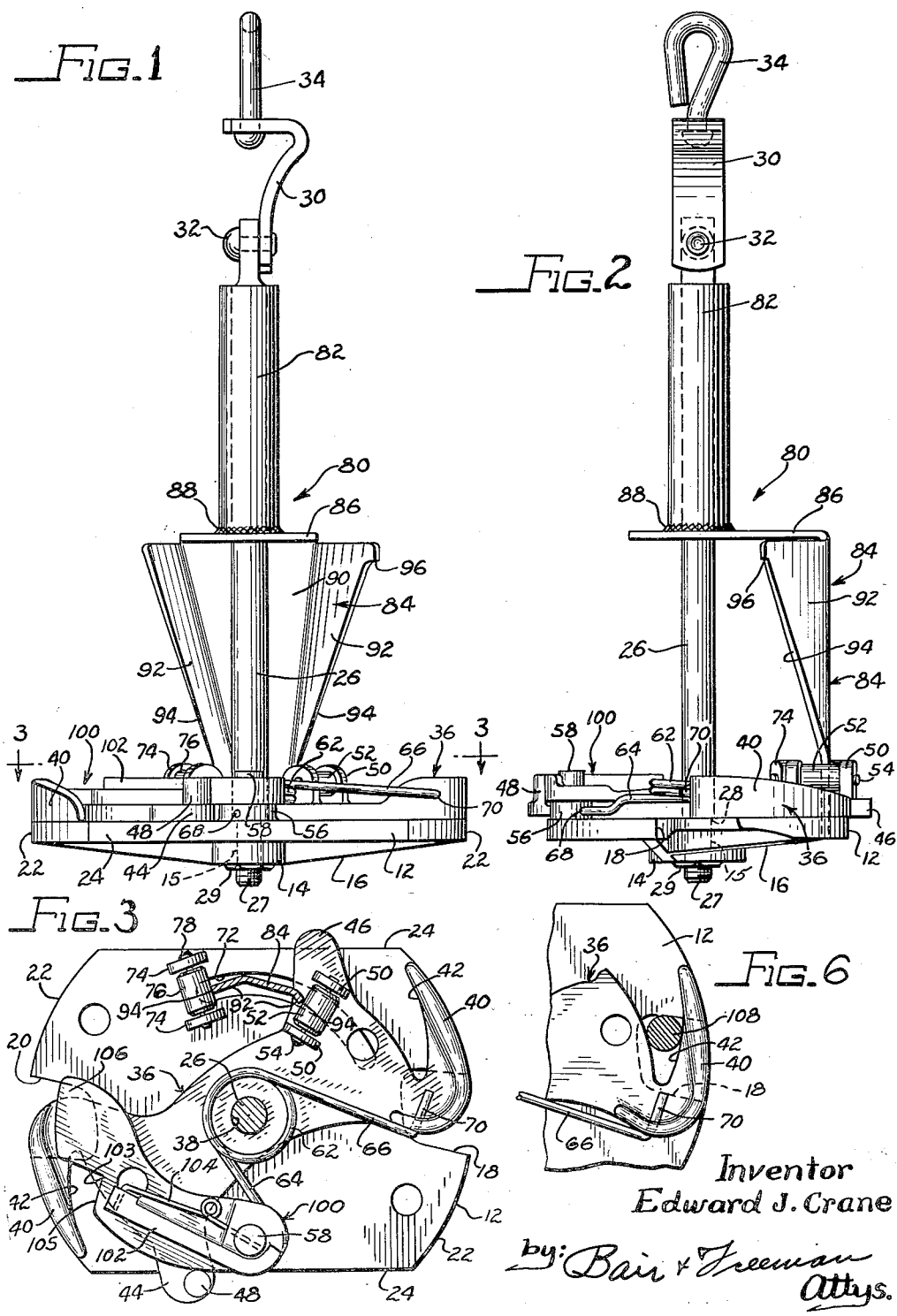
Oct. 21, 1952 — E. J. CRANE — 2,614,287
POULTRY SHACKLE
Filed June 25, 1949 — 2 SHEETS—SHEET 1
Inventor
Edward J. Crane
by: Bair & Freeman
Attys.

Patented Oct. 21, 1952

2,614,287

UNITED STATES PATENT OFFICE 2,614,287

POULTRY SHACKLE

Edward J. Crane, Ottumwa, Iowa, assignor to Barker Poultry Equipment Co., Ottumwa, Iowa, a corporation of Iowa Application June 25, 1949, Serial No. 101,469

12 Claims. (Cl. 17—44.1)

This invention relates to a shackle for holding fowl during a picking operation.

The shackle of the present invention is included in that general type which suspends the fowl by the legs in head-down position, and is mounted for carrying the fowl through a picking machine.

An object of the present invention is the provision of a poultry shackle adapted to be opened and closed, and to be locked in open position.

Another object is the provision of a shackle as just referred to, which is easily released from open locked position.

Still another object is the provision of a shackle as just referred to which is released from open locked position by the action of inserting a fowl's legs into the shackle, after which the shackle springs to closed position.

A further object is the provision of a shackle having openings for insertion of the legs of the fowl, members cooperable with the openings for gripping the legs which are movable to open and closed positions, and locking means for locking the gripping members in open position, in which the locking means is disposed in one of the openings and when it is engaged by one of the legs of the fowl, the gripping members are released and spring to closed position.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an elevational view of the new shackle of my invention;

Figure 2 is a view from the right of Figure 1;

Figure 3 is a view taken on line 3—3 of Figure 1;

Figure 4 is a view similar to Figure 1 but showing the shackle in open position;

Figure 5 is an enlarged view taken on line 5—5 of Figure 4;

Figure 6 is a partial view in plan of one end of the shackle showing the position of the parts when the leg of a fowl is gripped; and Figure 7 is a small scale view of a shackle illustrating the manner in which a fowl is suspended therefrom.

Referring in detail to the drawings, the shackle includes a base plate 12 preferably in the form of a casting and having a flat upper surface. On the underside of the base plate 12 is a downwardly depending annular boss 14 having a central hole 15 therein, and re-enforcing and strengthening ribs 16.

The ends of the base plate 12 are provided with notches 18 and 20 respectively, the ends being rounded or curved as indicated at 22. It will be noted from Figure 3 that the notches 18 and 20 open outwardly of the ends of the base plate 12 and are disposed longitudinally opposite each other. The side edges indicated at 24 are straight, as illustrated.

A stem 26 is provided for suspending the shackle, the stem having a threaded, reduced lower end 27, forming a shoulder 28. The lower end 27 is inserted in the hole 15, with the shoulder 28 engaging the base plate. A nut 29 is threaded on the end 27 for securing the base plate to the stem. The stem 26 is removable from the base plate 12 as will be understood, for the purpose of mounting a spade or wedge member which will be referred to later in detail. The upper end of the stem 26 is provided with a bracket 30 secured to the stem by means of a rivet 32 or other desired means. The bracket 30 is provided with a hook 34 by means of which the shackle can be mounted on a conveyor. Such a conveyor is ordinarily used in chicken picking operations and is employed for the purpose of carrying chickens or other fowl through a picking machine and to other stations employed in treatment and preparation of fowls.

The numeral 36 indicates what will be termed a gripping member and is of a novel and peculiar shape and arrangement which will be described in detail as the description proceeds. The gripping member 36 is provided with a central hole 38 by means of which the gripping member is pivotally mounted on the stem 26. The undersurface of the gripping member 36 is flat and smooth and is adapted to slide on the upper flat surface of the base plate 12. At the ends of the gripping member 36 are hook elements 40 extending in directions opposite each other and in directions which may be referred to as circumferentially of the device. The hook elements 40 are preferably rounded or curved on their outer surfaces to conform with the curvature of the end edges 22. Each hook element 40 forms a notch 42 with the main body of the gripping member and these notches 42 open outwardly from the gripping member in directions opposite each other and in directions generally transverse to the gripping member. The gripping member 36 is also provided with lugs or projections 44 and 46 extending laterally from the gripping member. On the lug 44 is an upwardly extending pin 48 which is preferably formed integral with the gripping member. A pair of upstanding, aligned ears 50, forming bearing members, which are preferably integral with the gripping member, are disposed opposite the pin 48. A roller 52 is mounted by means of a pin or shaft 54 which in turn is mounted in the ears 50.

Adjacent one side of the base plate 12 is an upstanding integral boss 56 and a pin 58 extending upwardly therefrom. A coil spring 62 is disposed with the coil thereof surrounding the stem 26 and the legs 64 and 66 arranged for actuation of the gripping member 36. The leg 64 has a bent over end extending into a hole in the boss 56 as indicated at 68 (Figure 2) and the leg 66 has a bent over end 70 fitted in a hole in an upstanding rib at the end of the gripping member 36. The coil spring 62 is such that the legs 64 and 66 thereof are normally biased apart as viewed in Figure 3, so that the leg 66 thereof biases the gripping member 36 in a counterclockwise direction, the leg 64 being fixedly anchored in the boss 56 and thereby in the base plate 12.

The base plate 12 is formed with an arcuate slot 72 having its center of curvature at or adjacent the axis of the stem 26. Adjacent one end of the slot 72 is a pair of ears 74, forming bearing members, and preferably integral with the base plate, in which is mounted a roller 76 mounted on a pin or shaft 78 which in turn is mounted in the bearing members 74. The roller 76 is disposed substantially perpendicular to the slot 72 at that point. It will be noted particularly in Figures 3 and 5 that one end of the gripping member 36 is adapted to move over a portion of the slot 72 and that the roller 52 is so disposed that at least a portion of it is directly over the slot.

The numeral 80 indicates as a whole what will be termed a spade element adapted for actuating the shackle to open position. The spade element 80 includes a tubular member 82 slidably mounted on the stem 26 and may be readily fitted thereon by removing the stem 26 from the base plate 12. The spade element 80 also includes a wedge member 84, preferably a single element in the form of a stamping, having a turned over flat portion 86 on its upper end. The flat portion 86 is provided with a hole through which the stem 26 extends and the portion 86 is welded to te lower end of the tubular element 82 as indicated at 88. The wedge member 84 includes a generally flat portion 90 and diagonally extending wings 92. The wedge member 84 tapers or converges downwardly forming wedging edges 94, one of the edges 94 having a downwardly facing shoulder 96 adjacent the top thereof, and the bottom of the wedge member having a leading element 98.

The wedge member 84 is disposed in the slot 72 with the edges in position for engaging the rollers 52 and 76.

A locking pawl 100, preferably a casting, and having an upstanding rib 102, is pivotally mounted on the pin 58, being supported on the boss 56. A coil spring 104 has one end fitted in a hole in the pin 58 and the other end in a hole in the opposite end of the rib 102 and normally biases the pawl 100 in a counterclockwise direction about its pivotal mounting. On one edge of the pawl 100 is a cut-out or a notch 103 forming a shoulder 105. The swinging end of the pawl, designated as 106, is adapted to move into and out of a position overlying the notch 20 in the base plate 12.

Figures 1, 2 and 3 illustrate the shackle in closed position, that is, when all of the parts are in stable position. To open the shackle to a position where the legs of a fowl can be inserted therein, the spade element 80 is forced downwardly. The means for actuating the spade element 80 may be any desired means; preferably an arrangement is provided whereby as the shackle moves along the conveyor an element engages the bent over portion 86 of the wedge element 84 and forces the spade element downwardly. The means for actuating the spade element does not constitute a part of the present invention and any desired means for this purpose may be used. As the spade element is lowered or forced downwardly the wedging edges 94 engage the respective rollers 52 and 76 and force them relatively apart, i. e., the roller 76 being fixedly supported, the roller 52 is spread therefrom and since the latter is mounted on the gripping element 36, the action rotates the gripping element in a clockwise direction to the position illustrated in Figures 4 and 5. The spread or divergence of the wedge element 84 is such that the hook elements 40 in the gripping member are moved entirely out of the position overlying the notches 18 and 20 (Figure 5) and likewise the notches 42 are of course totally removed out of register with the notches 18 and 20. When the gripping member 36 is moved to the position shown in Figure 5, the pin 48 moves in a clockwise direction to such a position that it can be received in the cut-out portion 103 and engaged by the shoulder 105. When the pin 48 moves into register with the notch 103, the spring 104 biases te pawl 100 in a counterclockwise direction and moves the latter so that the cut-out portion or notch 103 is fitted over the pin 48. As stated above the coil spring 62 biases the gripping member 36 in a counterclockwise direction, but in the position shown in Figure 5 the pin 48 is stopped by the shoulder 105 and in such a position the pawl 100 is in locking position. The shoulder 105 prevents the gripping member 36 from swinging in a counterclockwise direction and of course the gripping member is thereby held in open position or that position shown in Figure 5.

The shackle is then ready to receive a fowl. The operator grasps the legs of the fowl and inserts them in the notches 18 and 20. The numeral 108 diagrammatically represents the legs of the fowl. In Figure 5 the leg 108 at the left is in engagement with the end 106 of the pawl 100 and at the right the leg 108 is in the notch 18. The operator presses inwardly on the legs and the leg at the left (Figure 5) when forced against the end 106 of the pawl 100, swings the pawl in a clockwise direction and moves the shoulder 105 away from the pin 48. The gripping member 36 is then free to be rotated under the action of the coil spring 62 and it is thereby rotated counterclockwise and the legs of the fowl are gripped in the notches 42 of the gripping member. The notches 42 are tapered inwardly, thereby causing a wedging action on the legs of the fowl. Figure 6 illustrates one end of the gripping member in the position assumed after the latter is released and grips the leg of the fowl. In Figure 7 the numeral 110 indicates a fowl gripped in the manner above described.

When the fowl is to be released, after the picking or other operations are completed, the spade element 80 is again forced downwardly which moves the gripping member 36 to the position of Figure 5 and the fowl is permitted to drop therefrom. The shackle is then in position for again receiving another fowl.

It will be noted from Figure 7 that the design of the shackle is such that the legs of the fowl extend downwardly substantially vertically, which is in contrast with previous types of shackles wherein the legs were held at an objectionably wide angle.

It is desired that an advantageous feature of the invention be pointed out. The shackle is released from open locked position merely by forcing inwardly on the legs of the fowl and by means of only slight pressure the locking pawl 100 is moved to such a position that the gripping member is readily moved to position for gripping the fowl; the action is fast and convenient.

While I have herein shown and described a preferred embodiment of my invention, manifestly it is susceptible of modification and rearrangement of the parts without departing from the spirit and scope thereof. I do not therefore, wish to be understood as limiting my invention to the precise form herein disclosed, except as I may be so limited by the appended claims.

I claim as my invention:

1. In a shackle of the character disclosed, a base, a stem secured to said base, a gripping member pivotally mounted on said base, said gripping member forming leaves having cut-out portions, said base having cut-out portions, said gripping member, and thereby said leaves, being swingable into and out of a first position, which first position is where the respective cut-out portions in said leaves and cut-out portions in said base form leg holding elements, and wedge means slidably mounted on said stem and reactable between said gripping member and said base for swinging said gripping member out of said position.

2. In a shackle, a base in the form of a flat plate, said base having notches therein, a gripping member pivotally mounted on said base, said gripping member having notches therein and being movable into and out of a first position, which first position is where the notches in said gripping member register with and form leg holding means with the notches in said base, said base having a slot therein, one portion of said gripping member being swingable arcuately over said slot, and a wedge member slidable through said slot, said wedge member reacting between said base at one end of the slot and said gripping member and being adapted thereby to swing said gripping member out of said first position.

3. In a shackle of the character disclosed, a base, a stem secured to said base, a gripping member pivotally mounted on said base, said base having a cut-out portion, said gripping member being swingable into and out of a first position, within which first position said gripping member and the cut-out portion of said base cooperate to form leg holding means, and wedge means slidably mounted on said stem and reactable between said gripping member and said base for swinging said gripping member out of said first position.

4. In a shackle, a base, said base having a notch therein, a gripping member pivotally mounted on said base, said gripping member having a notch therein and being movable into and out of a first position, which first position is where the notch in said gripping member registers with and forms a leg holding means with the notch in said base, said base having a slot therein, one portion of said gripping member being swingable arcuately over said slot, and a wedge member slidable through said slot, said wedge member reacting between said base at one end of the slot and said gripping member and being adapted thereby to swing said gripping member out of said first position.

5. In a shackle, a base, a gripping member pivotally mounted on said base, said base and gripping member each having a pair of notches formed therein, said gripping member notches and said base notches cooperating when the gripping member is in a first position to form elements for holding the legs of an animal, said gripping member being pivotable to an inoperative position wherein the base notches are adapted to have the legs of the animal inserted therein, locking means including a pawl pivoted on said base for locking the gripping member in said inoperative position, means operatively associated with said gripping member biasing said gripping member towards the first position, said pawl overlying one of the base notches and adapted to be actuated by the leg of the animal being inserted in said one base notch to release said gripping member from said inoperative position, whereby the gripping member is moved to said first position, a wedge adapted to be reciprocated in a direction transverse to said base, said base having a slot therein adapted to receive said wedge, a rotatable member mounted on said base for cooperation with said wedge, and a second rotatable member mounted on said gripping member for cooperating with said wedge, whereby as the wedge is forced between said rotatable members, the gripping member is pivoted to said inoperative position.

6. In a shackle, a base, a gripping member pivotally mounted on said base, said base and gripping member each having a pair of notches formed therein, said gripping member notches and said base notches cooperating when the gripping member is in a first position to form elements for holding the legs of an animal, said gripping member being pivotable to an inoperative position wherein the base notches are adapted to have the legs of the animal inserted therein, means operatively associated with said gripping member biasing said gripping member towards the first position, a pawl pivotally mounted on said base, a portion of said pawl overlying one of said base notches, resilient means operatively associated with said pawl biasing said pawl in one direction about its pivotal mounting, means on said pawl and means on said gripping member operatively associated with the pawl and cooperating to restrain said gripping member in said inoperative position, said gripping member being releasable from said inoperative position by application of force upon said pawl in a direction inwardly of said one notch in the base to move said pawl about its pivotal mounting in the direction opposite to said direction of bias.

7. In a shackle, a base, a gripping member pivotally mounted on said base, said base and gripping member each having a pair of notches formed therein, said gripping member notches and said base notches cooperating when the gripping member is in a first position to form elements for holding the legs of an animal, said gripping member being pivotable to an inoperative position wherein the base notches are adapted to have the legs of the animal inserted therein, means including locking elements on said base and on said gripping member for locking the gripping member in said inoperative position, one of said locking elements being pivotally mounted, means operatively associated with said gripping member biasing the gripping member towards the first position, said pivotally mounted locking element overlying one of said base notches, and adapted to be actuated by the leg of the animal being inserted in said one base notch to release said gripping member, whereby the gripping member is moved to said first position.

8. In a shackle of the character disclosed, a base, said base being provided with notches, a gripping member pivoted on said base, said gripping member forming a plurality of leaves provided with notches, said gripping member, and thereby said leaves, being swingable into an operative position wherein the notches in said leaves and notches in said base register to form leg holding means, means comprising cooperative elements on said base and said gripping member adapted when actuated for swinging said gripping member out of said operative position, a pawl pivoted on said base and overlying one of said notches in said base, said gripping member having a portion adapted to be engaged by said pawl, whereby said pawl locks said gripping member in an inoperative position, and the pivoting of said pawl under a force applied thereto providing for release of said gripping member from said inoperative position.

9. In a shackle of the character disclosed, a base, said base being provided with notches, a gripping member pivoted on said base, said gripping member forming a plurality of leaves provided with notches, said gripping member, and thereby said leaves, being swingable into and out of an operative position, wherein the notches in said leaves and the notches in said base register to form leg holding means, slidable wedge means operable between said base and said gripping member adapted for swinging said gripping member out of said operative position, a pawl pivoted on said base and overlying one of said notches in said base, said gripping member having a portion adapted to be engaged by said pawl, whereby said pawl locks said gripping member in an inoperative position, said gripping member being releasable from inoperative position by force applied to the pawl in a direction inwardly of said one notch in the base.

10. In a shackle of the character disclosed, a base, said base having spaced notches therein, a gripping member pivoted on said base at a point between the notches in said base, said gripping member forming a plurality of leaves provided with notches, said gripping member, and thereby said leaves, being swingable into and out of an operative position wherein the notches in said leaves and the notches in said base register to form leg holding means, means operatively associated with the base and gripping member to bias said gripping member towards said first position, means comprising cooperative elements on said base and said gripping member adapted when actuated for swinging said gripping member out of said first position, a pawl pivoted on said base and overlying one of said notches in said base, said pawl being pivoted on said base at a point offset with respect to a line between the notches in said base, said gripping member having a portion engageable by said pawl, whereby said pawl locks said gripping member out of said first position, and said pawl being adapted to release said gripping member upon force being applied to said pawl in a direction inwardly of said one notch in the base.

11. In a device of the character disclosed, a base, said base having spaced notches therein, a gripping member pivotally mounted on said base at a point between the notches in the base, said gripping member having notches therein, said gripping member being swingable into and out of a gripping position wherein the notches therein form leg holding means with the notches in the base, a pawl pivoted on said base at a point offset from a line extending between the notches in the base, a pin on said gripping member, said pawl having a notch therein adapted to receive said pin, when said gripping member is pivoted out of said gripping position, and thereby lock said gripping member in an inoperative position, said pawl being locked to said gripping member when the gripping member is in said inoperative position, a porton of the pawl spaced from its pivot point overlying one of the notches in the base when said pawl is locked to said gripping member, means operatively associated with said pawl biasing said pawl toward said locked position, said pawl being movable out of said locked position by force applied thereto in a direction inwardly of the respective notch in the base, and means operatively associated with said gripping member biasing said gripping member toward said gripping position.

12. In a shackle of the character disclosed, a base, said base being provided with at least one notch, a gripping member pivoted on said base, said gripping member being swingable into an operative position wherein said gripping member and the notch in said base cooperates to form holding means, means comprising cooperative elements on said base and said gripping member adapted when actuated for swinging said gripping member out of said operative position, a pawl pivoted on said base and overlying said notch in the base, and said gripping member having a portion engageable by said pawl, whereby said pawl is adapted to lock said gripping member in an inoperative position.

EDWARD J. CRANE.

REFERENCES CITED

The following references are of record in the file of this patent:

UNITED STATES PATENTS

| Number | Name | Date |
| --- | --- | --- |
| 1,166,382 | Morse | Dec. 28, 1915 |
| 2,435,706 | Barker | Feb. 10, 1948 |

FOREIGN PATENTS

| Number | Country | Date |
| --- | --- | --- |
| 871 | Great Britain | 1861 |